US012576713B2

(12) United States Patent
Zhang et al.

(10) Patent No.: US 12,576,713 B2
(45) Date of Patent: Mar. 17, 2026

(54) DISPLAY METHOD, VEHICLE, AND MEDIUM

(71) Applicant: Xiaomi EV Technology Co., Ltd.,
Beijing (CN)

(72) Inventors: Bo Zhang, Beijing (CN); Xiuyang Wang, Beijing (CN); Zhongqiang Li,
Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/827,006

(22) Filed: Sep. 6, 2024

(65) Prior Publication Data

US 2025/0303858 A1    Oct. 2, 2025

(30) Foreign Application Priority Data

Mar. 28, 2024    (CN) .......................... 202410371302.3

(51) Int. Cl.
| | |
|---|---|
| *B60K 35/21* | (2024.01) |
| *B60K 35/22* | (2024.01) |
| *B60K 35/81* | (2024.01) |
| *G06F 3/048* | (2013.01) |
| *G06F 3/04815* | (2022.01) |
| *G06F 3/0484* | (2022.01) |

(52) U.S. Cl.
CPC ............ *B60K 35/211* (2024.01); *B60K 35/22* (2024.01); *B60K 35/81* (2024.01); *B60K 2360/162* (2024.01); *B60K 2360/171* (2024.01); *B60R 2300/602* (2013.01); *B60R 2300/605* (2013.01); *G06F 3/048* (2013.01); *G06F 3/04815* (2013.01); *G06F 3/0484* (2013.01)

(58) Field of Classification Search
CPC ...... B60K 35/211; B60K 35/22; B60K 35/81; B60K 2360/162; B60K 2360/171; G06F 3/048; G06F 3/04815; G06F 3/04817; G06F 3/0484; G06F 3/04847; G06F 9/451; G02B 30/40; G02B 30/52; H04N 13/395; H04N 13/398; B60R 2300/602; B60R 2300/605
See application file for complete search history.

(56) References Cited

U.S. PATENT DOCUMENTS

| | | | | |
|---|---|---|---|---|
| 9,346,358 B2 * | 5/2016 | Kinoshita | ........... | G06F 3/04842 |
| 11,573,676 B2 * | 2/2023 | Tarchala | ................ | G06T 13/20 |
| 2011/0282537 A1 * | 11/2011 | Yamasaki | ............ | G06F 3/0346 |
| | | | | 701/31.4 |

(Continued)

FOREIGN PATENT DOCUMENTS

| | | |
|---|---|---|
| CN | 116954805 A | 10/2023 |
| DE | 102007014530 A1 | 10/2008 |
| EP | 3040830 A1 | 7/2016 |

*Primary Examiner* — Douglas Wilson
(74) *Attorney, Agent, or Firm* — Volpe Koenig

(57) ABSTRACT

A display method, includes: loading a switched target application in a first window in response to an application switching action; switching a viewing angle of a three dimensions in-vehicle model preloaded in a second window according to the target application, where the second window is a window below a layer of the first window; and displaying an application operation interface corresponding to the target application and a model interface of the three dimensions in-vehicle model corresponding to the target application.

20 Claims, 5 Drawing Sheets

Hide a pre-switching application from a first window in response to an application switching action — S111

Load a switched target application in the first window in a case where the pre-switching application is hidden — S112

(56)         References Cited

U.S. PATENT DOCUMENTS

| | | | |
|---|---|---|---|
| 2012/0120066 A1* | 5/2012 | Hirota | G06F 3/04815 345/419 |
| 2014/0095030 A1* | 4/2014 | Boblett | B60J 7/043 701/49 |
| 2015/0274016 A1* | 10/2015 | Kinoshita | B60R 1/27 701/36 |
| 2018/0339654 A1* | 11/2018 | Kim | B60K 35/28 |
| 2019/0004693 A1* | 1/2019 | Kassner | B60R 1/23 |
| 2019/0391732 A1* | 12/2019 | Jing | H04M 19/04 |
| 2025/0173107 A1* | 5/2025 | Zhou | G06F 3/04886 |

* cited by examiner

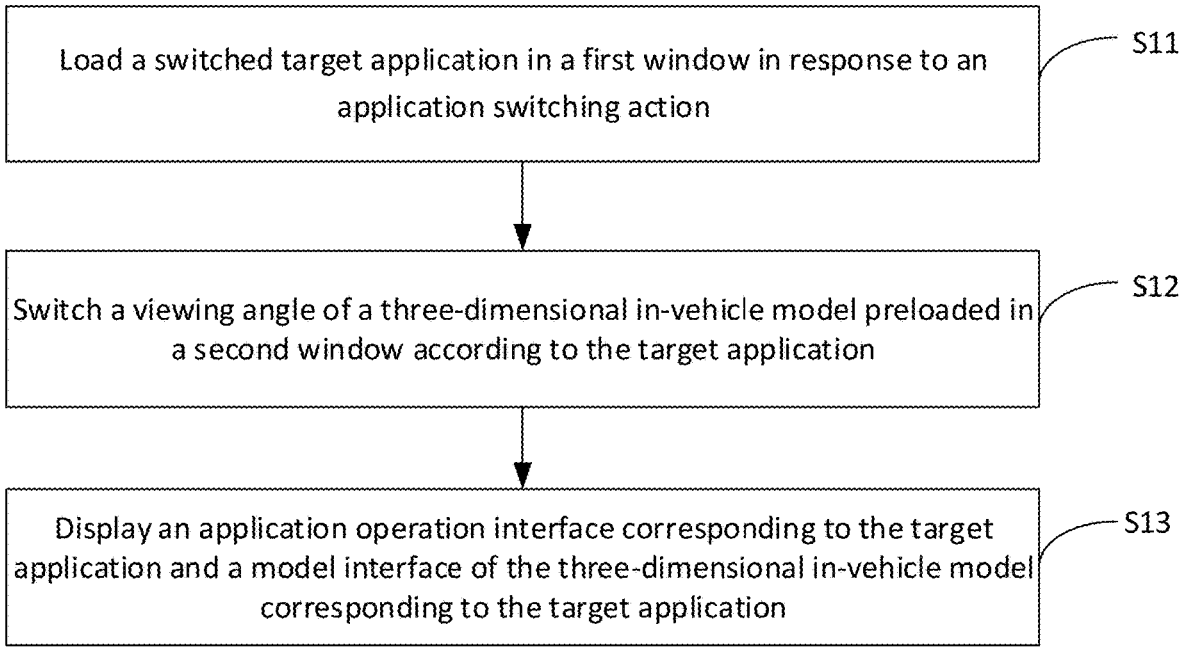

Load a switched target application in a first window in response to an application switching action — S11

Switch a viewing angle of a three-dimensional in-vehicle model preloaded in a second window according to the target application — S12

Display an application operation interface corresponding to the target application and a model interface of the three-dimensional in-vehicle model corresponding to the target application — S13

FIG. 1

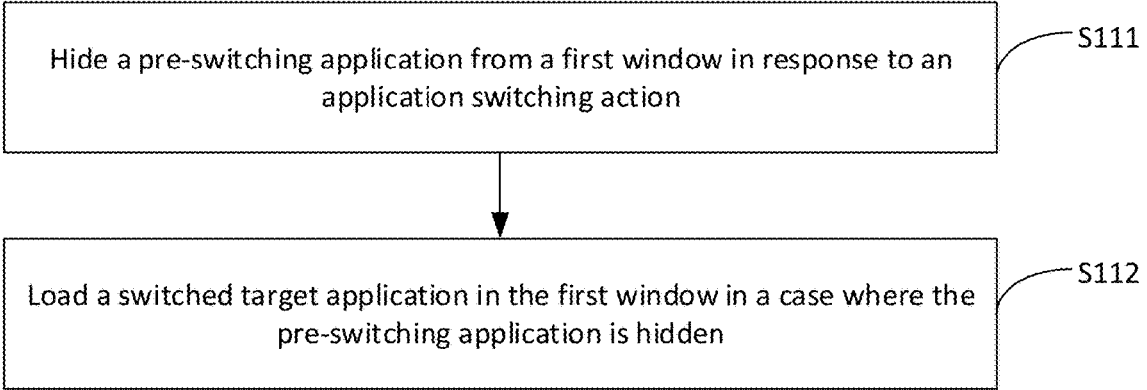

Hide a pre-switching application from a first window in response to an application switching action — S111

Load a switched target application in the first window in a case where the pre-switching application is hidden — S112

FIG. 2 b1

Desktop window b2

Air conditioner
window b3

3D vehicle model
wallpaper window

S31
*Click to enter an air
conditioner*

User
3a

S32
*Page hiding starts*

S33
*Page display starts*

N1
*A notification to enter
the air conditioner*

S34
*A 3D vehicle model
is switched from a
desktop viewing
angle to an air
conditioner viewing
angle*

N2
*A switching completion
notification of the
completion of the vehicle
model animation*

S36
*Page hiding ends*

S35
*Page display ends*

S37
*Respond to an air
conditioner
operation*

FIG. 3

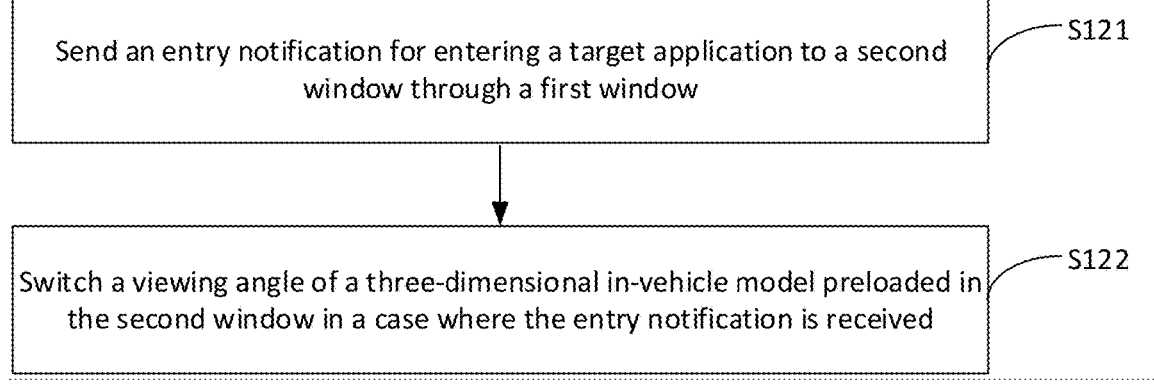

Send an entry notification for entering a target application to a second
window through a first window

S121

Switch a viewing angle of a three-dimensional in-vehicle model preloaded in
the second window in a case where the entry notification is received

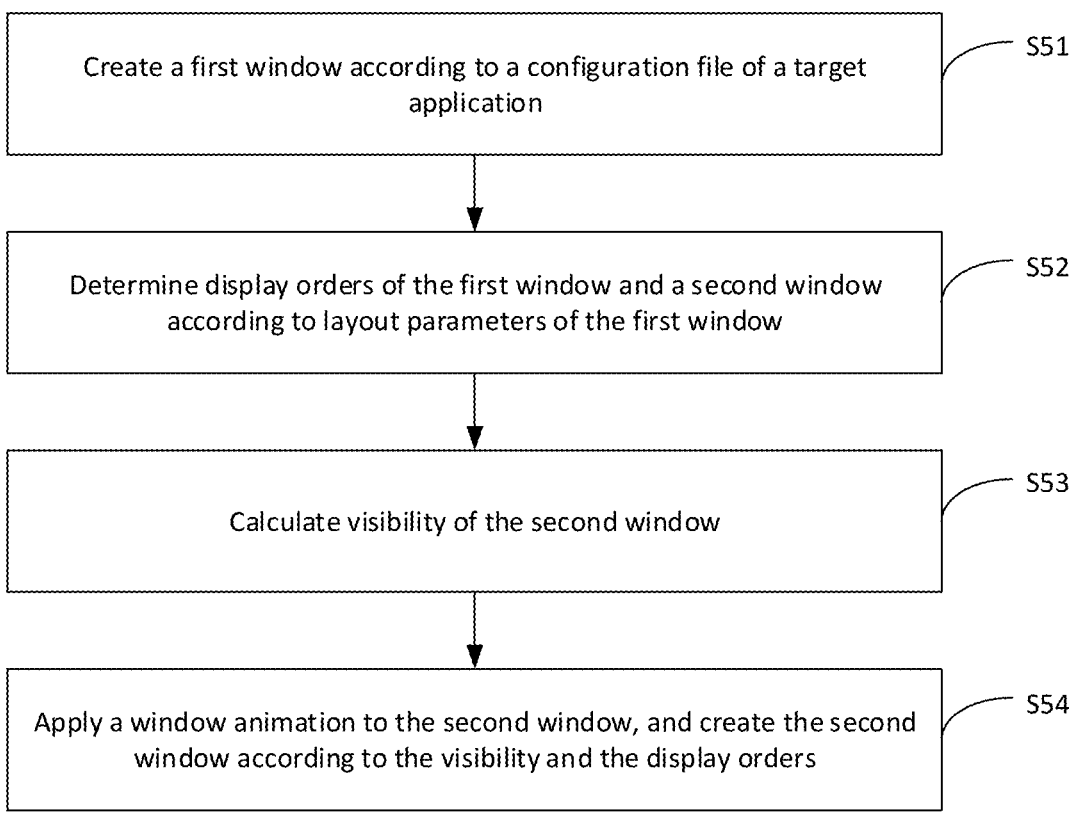

Create a first window according to a configuration file of a target application — S51

Determine display orders of the first window and a second window according to layout parameters of the first window — S52

Calculate visibility of the second window — S53

Apply a window animation to the second window, and create the second window according to the visibility and the display orders — S54

FIG. 5

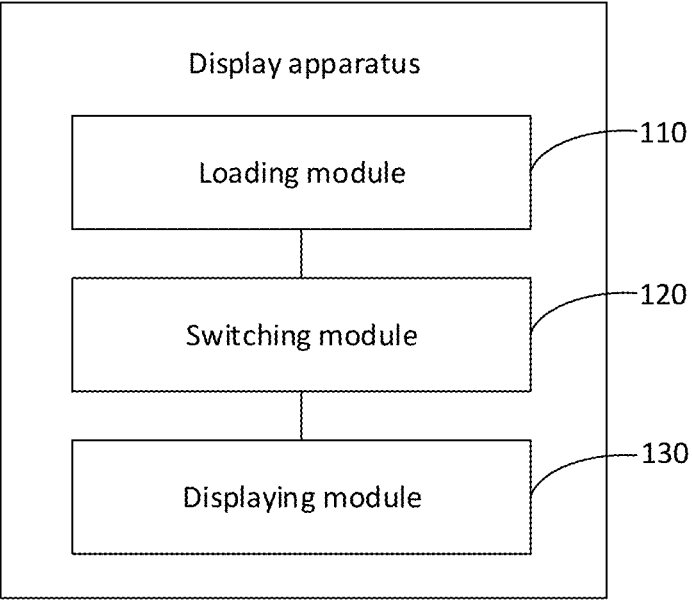

Display apparatus

Loading module — 110

Switching module — 120

Displaying module — 130

FIG. 6

DISPLAY METHOD, VEHICLE, AND MEDIUM

CROSS-REFERENCES

The present application claims the benefit of priority to Chinese Application No. 202410371302.3, filed on Mar. 28, 2024, the contents of which are incorporated herein by reference in their entirety for all purposes.

BACKGROUND OF THE INVENTION

An application of a smart cockpit enables a user to intuitively see a vehicle state and feel control feedback of the application on a vehicle through the introduction of a three-dimensional (3D) vehicle model, referred to as a 3D vehicle model.

SUMMARY OF THE INVENTION

The disclosure relates to the technical field of smart cockpits, in particular to a display method and apparatus, a vehicle, a medium, and a program product.

According to a first aspect of examples of the disclosure, a display method is provided, including: loading a switched target application in a first window in response to an application switching action; switching a viewing angle of a three-dimensional in-vehicle model preloaded in a second window according to the target application, where the second window is a window below a layer of the first window; and displaying an application operation interface corresponding to the target application and a model interface of the three-dimensional in-vehicle model corresponding to the target application.

According to a second aspect of the examples of the disclosure, a vehicle is provided, including: one or more processors; and one or more memories configured to store processor-executable instructions. Where the one or more processors are configured to execute the processor-executable instructions stored in the memory, the one or more processors are configured to: load a switched target application in a first window in response to an application switching action; switch a viewing angle of a three-dimensional in-vehicle model preloaded in a second window according to the target application, wherein the second window is a window below a layer of the first window; and display an application operation interface corresponding to the target application and a model interface of the three-dimensional in-vehicle model corresponding to the target application.

According to a third aspect of the examples of the disclosure, a non-transitory computer-readable storage medium storing a computer program is provided, and the computer program, in response to being executed by a processor, implements: loading a switched target application in a first window in response to an application switching action; switching a viewing angle of a three-dimensional in-vehicle model preloaded in a second window according to the target application, wherein the second window is a window below a layer of the first window; and displaying an application operation interface corresponding to the target application and a model interface of the three-dimensional in-vehicle model corresponding to the target application.

According to a fourth aspect of the examples of the disclosure, a computer program product including a computer program is provided, and the computer program, in response to being executed by a processor, implements steps of the method according to the first aspect.

It is to be understood that the above general descriptions and later detailed descriptions are merely examples and illustrative, and cannot limit the disclosure.

BRIEF DESCRIPTION OF DRAWINGS

Accompanying drawings here are incorporated into the specification, constitute a part of the specification, show examples consistent with the disclosure, and are used to explain a principle of the disclosure together with the specification.

FIG. 1 is a flowchart of a display method illustrated according to an example.

FIG. 2 is a flowchart of implementing step S11 in FIG. 1, illustrated according to an example.

FIG. 3 is a flowchart of another display method illustrated according to an example.

FIG. 4 is a flowchart of implementing step S12 in FIG. 1, illustrated according to an example.

FIG. 5 is a flowchart of creating a first window and a second window illustrated according to an example.

FIG. 6 is a block diagram of a display apparatus illustrated according to an example.

DETAILED DESCRIPTION OF THE INVENTION

Figure 7:
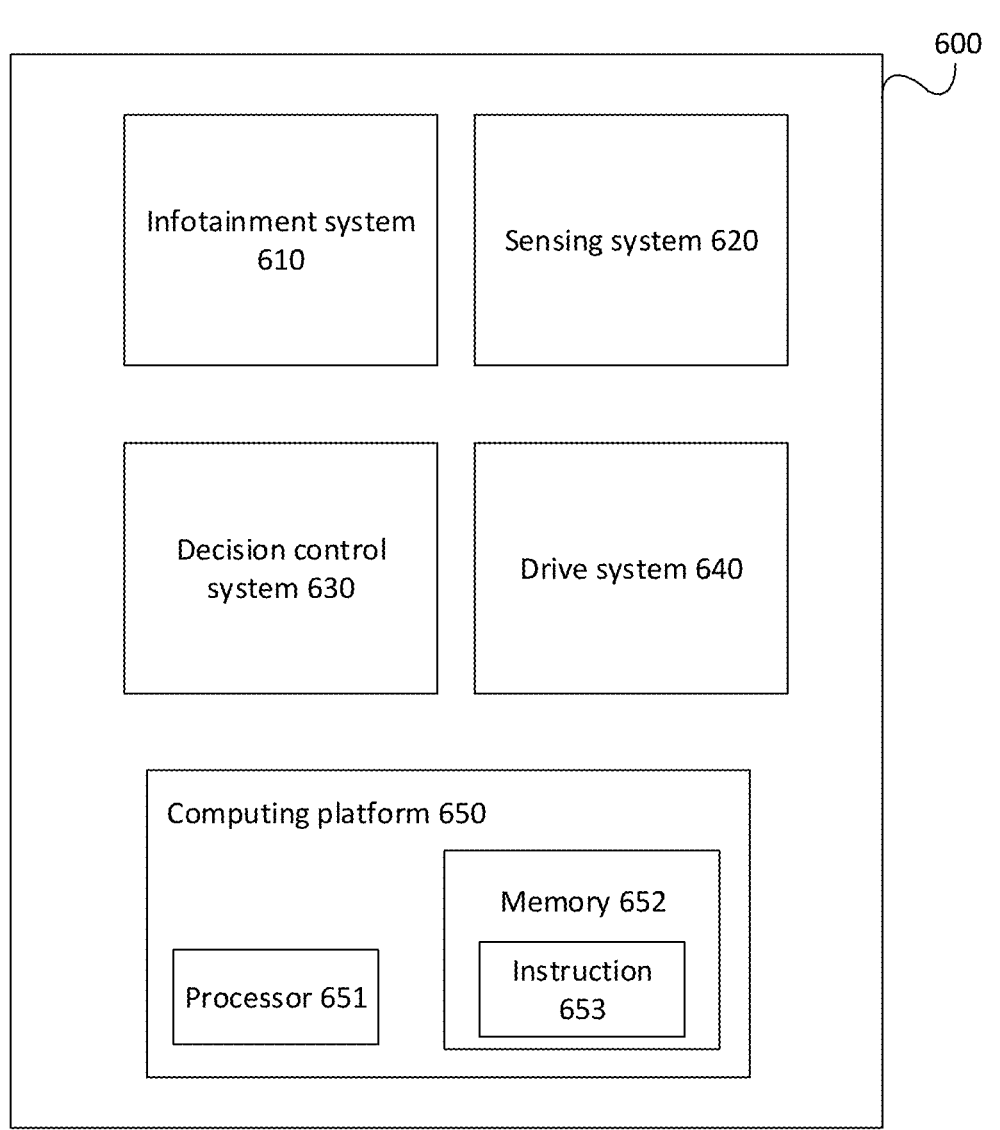
FIG. 7 is a block diagram of a vehicle illustrated according to an example.

Examples will be illustrated in detail here, and their instances are shown in accompanying drawings. When the following description refers to the accompanying drawings, unless otherwise indicated, the same numbers in different accompanying drawings indicate the same or similar elements. Embodiments described in the following examples do not represent all embodiments consistent with the disclosure. Rather, they are merely instances of apparatuses and methods consistent with some aspects of the disclosure as detailed in the appended claims.

Embodiments described in some examples of disclosure do not represent all embodiments consistent with the disclosure. Rather, they are merely instances of apparatuses and methods consistent with some aspects of the disclosure as detailed in the appended claims.

It needs to be noted that all actions of acquiring signals, information, or data in the disclosure are performed in compliance with corresponding data protection regulations and policies of the country in which they are located, and with authorization granted by owners of corresponding apparatuses.

An application of a smart cockpit enables a user to intuitively see a vehicle state and feel control feedback of the application on a vehicle through the introduction of a three-dimensional (3D) vehicle model, referred to as a 3D vehicle model. However, the smart cockpit is configured with a plurality of applications. The plurality of applications will each introduce a 3D vehicle model, e.g., some of the applications introduce a 3D vehicle model, some of the applications introduce a 3D vehicle model at the same time, and ultimately, a plurality of 3D vehicle models will be introduced so that different viewing angles and elements are loaded according to the needs of the applications. This not only leads to the complex steps of introducing the 3D vehicle models through the applications of the smart cockpit, but also to a large and repetitive development workload. Moreover, there is repetitive loading of basic resources, which causes wasted memory and CPU resources. In addition, the applications are prone to technical problems such as lagging, flickering, and slow loading due to frequent loading and unloading of resources during switching.

To solve problems existing in the related art, the disclosure provides a display method and apparatus, a vehicle, a medium, and a program product.

FIG. 1 is a flowchart of a display method illustrated according to an example. As shown in FIG. 1, the method may be performed by a smart cockpit and includes the following steps S11-S13.

In step S11, a switched target application is loaded in a first window in response to an application switching action.

An application may refer to an application instance running on an on-board unit (e.g., a smart cockpit), and the application instance contains codes, data, and system resources executed by a program.

In the example of the disclosure, the first window and a second window may each be a rectangular area in a graphical user interface (GUI) and are used for displaying an interface or content of the application. A user may interact with the application through the windows. The first window may be used for loading a user interface (UI) element of the application, and the second window may be used for loading a 3D vehicle model.

It may be noted that the 3D vehicle model is loaded following a start of the smart cockpit (or an on-board unit system) in a case of every start of the smart cockpit (or on-board unit system), so there is no need to load the 3D vehicle model again in a case of application switching. Thus, switching efficiency may be improved.

An application operation interface of the target application may be displayed on a desktop, so that an executable file of the target application may be found, its code and data may be loaded into a memory, and a new process may be created to run the application. Then, interface elements of the application are loaded in the first window, which typically include the application's window frame, menu bar, toolbar, and an application-specific content area.

In the example of the disclosure, the user triggers the application switching action by clicking on an icon, a shortcut, or a gesture such as swiping, etc., at an in-vehicle central control screen. After the switching action is received, a new application after switching may start to be loaded, and interface elements of the application are loaded in the first window. For example, if the user clicks on an air conditioner operation icon on a taskbar, in response to the switching action, elements of an application for an air conditioner operation start to be loaded in the first window, and an interface for the air conditioner operation as well as an air conditioner model interface of the 3D vehicle model as a wallpaper are displayed in a very short time.

In step S12, a viewing angle of the three-dimensional in-vehicle model preloaded in the second window is switched according to the target application.

The second window is a window below a layer of the first window.

The layer may be an independent element that makes up an image, so the second window is constructed below the layer of the first window, and both the first window and the second window may be edited separately without affecting each other. In a window system of the smart cockpit, different windows may be regarded as different layers, and effects such as overlaying and hiding of the windows may be realized through layer management.

The three-dimensional in-vehicle model may be a three-dimensional model that simulates a vehicle's exterior and interior structure, which may be rendered and displayed in the smart cockpit. Thus, vehicle information may be displayed, a vehicle function may be displayed, and a user interaction interface may be displayed.

Switching the viewing angle of the three-dimensional in-vehicle model preloaded in the second window may be animation switching, i.e., in the interface display process of the vehicle center control screen, the display viewing angle of the vehicle model is changed through an animation effect, so that a smooth transition of the interface from one state to another state is realized.

In step S13, the application operation interface corresponding to the target application and a model interface of the three-dimensional in-vehicle model corresponding to the target application are displayed.

Figures 8, 9:
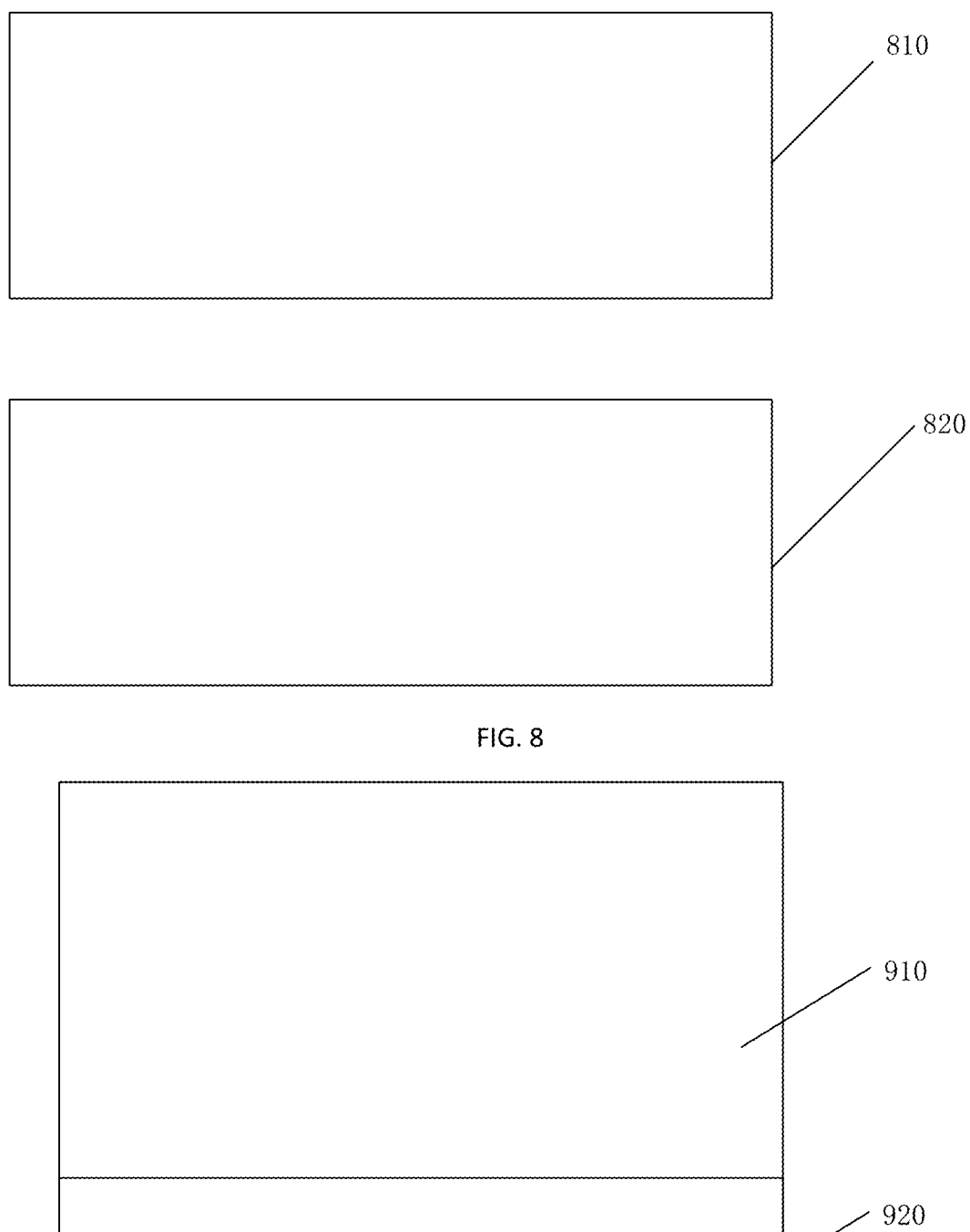
FIG. 8 is a schematic diagram showing the layer relationship between a first window and a second window according to an example.
FIG. 9 is a block diagram of an application operation interface and a model interface illustrated according to an example.

FIG. 8 is a schematic diagram showing the layer relationship between a first window and a second window according to an example. A layer of the first window 810 and a layer of the second window 820 are shown in FIG. 8.

FIG. 9 is a block diagram of an application operation interface and a model interface illustrated according to an example. Application operation interface 920 and model interface 910 are shown in FIG. 9.

In the example of the disclosure, not only is the operation interface of the target application displayed in the first window, but the viewing angle of the three-dimensional in-vehicle model related to the target application is also switched in the second window. For example, continuing with the above example, when the user switches to the application for the air conditioner operation, not only is the application for the air conditioner operation loaded in the first window, but also the application operation interface for the air conditioner operation in the first window and the three-dimensional in-vehicle model of the air conditioner operation interface may be displayed simultaneously after loading is completed. Through the smooth animation effect, the viewing angle of the in-vehicle model is gradually switched, and the application operation interface for the air conditioner operation and the air conditioner interface of the three-dimensional in-vehicle model are ultimately presented, through which the user may turn an air conditioner on and off, adjust a temperature, etc.

In the example of the disclosure, the viewing angle of the three-dimensional in-vehicle model corresponding to the target application is switched in the second window (the window located below the layer of the first window). This usually involves advanced techniques of graphic rendering and layer management. It is possible to obtain data of the three-dimensional in-vehicle model related to the target application, which may include a geometric shape, texture, illumination information, etc., of the model. Then, a graphic rendering engine is used to render the three-dimensional model in the second window, so that it presents a realistic visual effect. An animation technique may be used to smoothly switch the display viewing angle of the three-dimensional in-vehicle model, so that it gradually transitions to the model interface corresponding to the target application. The animation process may be realized through techniques such as an interpolation algorithm and a time control so as to provide a smooth and natural visual experience.

It may be noted that, compared to the prior art, in which UI elements and a 3D vehicle model are loaded in the same window, during application switching, it is possible to avoid the need to unload the 3D vehicle model corresponding to the pre-switching application and then load the 3D vehicle model corresponding to the switched application. In other words, the UI elements are loaded in the first window, the 3D vehicle model in the second window does not need to be unloaded, the viewing angle is directly switched, thus the efficiency of vehicle model switching is improved, and resource occupation is reduced.

In the above technical solution, the switched target application is loaded in the first window in response to the application switching action. The viewing angle of the three-dimensional in-vehicle model preloaded in the second window is switched according to the target application, and the second window is the window below the layer of the first window. The application operation interface corresponding to the target application and the model interface of the three-dimensional in-vehicle model corresponding to the target application are displayed. The vehicle model is pre-loaded in the second window, so that during application switching, there is no need to unload and then load, which not only reduces resource occupation during the application switching and reduces memory and CPU occupation, but also improves efficiency of the application switching, and improves user experience by cooperating with a viewing angle switching animation of the vehicle model.

Alternatively, as shown in FIG. 2, in step S11 of FIG. 1, loading the switched target application in the first window in response to the application switching action includes the following steps: S111 and S112.

In step S111, the pre-switching application is hidden from the first window in response to the application switching action.

In the example of the disclosure, when the user executes the application switching action (such as clicking on an icon on the taskbar or using a shortcut), the smart cockpit may capture the action and start processing. Firstly, it is possible to identify the target application that the user wants to switch to. The target application may already be running in the background, or may need a new start. Then, the state of the window system may be managed to ensure that the interface elements of the target application are loaded and displayed in the first window. This usually involves an operation of a window manager, which is responsible for updating a content of the first window to a content of the operation interface of the target application.

In the process of application switching, in order to ensure the clear user interface and avoid confusion of the interface elements, an operating system will hide a currently displayed page (i.e., an application operation interface before switching) from the first window. For example, the currently displayed page is hidden from the first window, and when the application operation interface before switching needs to be displayed again, the application operation interface before switching is reloaded to the first window.

For example, when the user clicks on an air conditioner operation icon, the smart cockpit responds to the switching action to hide a current desktop window (i.e., a page before switching) from the first window. This means that the desktop window and its content are no longer currently displayed.

In step S112, the switched target application is loaded in the first window in a case where the pre-switching application is hidden.

In the case where the pre-switching application is hidden from the first window, the smart cockpit may load the interface elements corresponding to the target application (if it is not already running). This involves reading an executable file and related resources of the application from a storage medium (such as a hard disk), loading them into a memory, and creating a process to execute them. Once the application is loaded, the smart cockpit may use the window system to render the content of the operation interface of the target application into the first window and display it on the desktop. The process includes drawing interface elements such as controls, text, and images to ensure the correct presentation of the application operation interface.

Throughout the process, the plurality of components, such as the operating system, the window manager, and the graphic rendering engine, work cooperatively to respond to the switching action of the user and smoothly display the new application operation interface. This involves complex process management, memory management, graphic rendering, and other techniques, but ultimately presents the user with a simple, intuitive, and smooth application switching experience.

As shown in FIG. 3, entering the air conditioner operation interface is taken as an example, when, in step S31, the user 3a clicks to enter the air conditioner, the desktop window b1 displayed in the first window executes a page hiding start operation S32, so that the desktop window b1 may be hidden from the first window. At the same time, an air conditioner window b2 is loaded in the first window, and a page display start operation S33 of the air conditioner window b2 is executed. Hiding is simply a way of temporarily not displaying the elements of the application in the first window, and in a case where the elements of the application need to be displayed in the first window, the interface elements corresponding to the application may be directly loaded again.

In this way, in the application switching process, the smart cockpit may manage and coordinate different components to ensure the smoothness of interface switching and the clarity of the user interface.

Alternatively, as shown in FIG. 4, in step S12, switching the viewing angle of the three-dimensional in-vehicle model preloaded in the second window according to the target application includes the following steps: S121 and S122.

In step S121, an entry notification for entering the target application is sent to the second window through the first window.

The first window is a window with which the user currently interacts and is located at the front end of a screen, while the second window may be a wallpaper window located behind the first window and is used for waiting to receive a specific instruction or event to execute a corresponding operation.

When the user triggers an action for entering the target application, the first window captures the event. The event may be a screen swipe or a screen click selection. Once the event is captured, the first window parses an intention of the user and determines which target application the user wants to enter. Next, the first window needs to send an entry notification to the second window. The notification is usually a message or signal that contains information about the target application and a request to enter the application. To realize an inter-window communication, the smart cockpit may provide a set of communication mechanisms that allow messages and data to be transmitted between windows.

Before sending the entry notification, the first window may need to interact with the smart cockpit to obtain a handle or identifier of the second window. The handle is a unique identifier used for locating and managing windows in the smart cockpit. By obtaining the handle of the second window, the first window may ensure that the notification is sent to a correct target. Once the first window obtains the handle of the second window, it may construct and enter a notification message. The message may contain an identifier of the target application, the intention of the user, and other necessary parameters. Then, the message is sent to the second window through the first window by using the communication mechanisms of the operating system.

For example, the user clicks on an in-vehicle application icon on the desktop or executes a related operation, which triggers an action for entering the in-vehicle application. The action is captured by the first window (currently displaying the other application operation interface), and a notification is sent to the second window located below it for notifying of an upcoming entry into the in-vehicle application. Continuing to see FIG. 3, the air conditioner window b2 displayed in the first window may send a notification N1 to enter the air conditioner to the 3D vehicle model wallpaper window b3.

In step S122, the viewing angle of the three-dimensional in-vehicle model preloaded in the second window is switched in a case where the entry notification is received.

When the second window receives the entry notification from the first window, it parses the message and executes corresponding operations according to the information in the message. This may include switching to the viewing angle of the three-dimensional in-vehicle model corresponding to the target application, preparing an animation switching effect, etc. Moreover, the second window initiates an animation transition effect to smoothly switch the display viewing angle of the model from an initial state to the viewing angle of the user interface corresponding to the in-vehicle application. Continuing to see FIG. 3, in a case where the 3D vehicle model wallpaper window b3 receives the notification N1 to enter the air conditioner, the 3D vehicle model is switched from a desktop viewing angle to an air conditioner viewing angle in S34.

Animation switching may involve a plurality of steps. First, the second window calculates a path or trajectory from a current viewing angle to a target viewing angle. The path may be linear, curved, or other shapes, depending on the intention of a designer or developer. The second window then gradually updates the viewing angle of the model at certain time intervals so that it moves along the calculated path. The second window re-renders the model each time the viewing angle is updated, so that it is ensured that the user sees a continuous and smooth animation effect. In the animation switching process, the second window may also add some additional visual effects, such as fading in and out, zooming, and rotating, to enhance the visual effect and attractiveness of the switching.

Eventually, when the animation switching is completed, the second window displays the model interface corresponding to the target application. The interface may include various controls, buttons, dashboards, and other elements with which the user may interact to operate or control the target application.

With the above technical solution, the user can experience the effect of smoothly switching from the model interface corresponding to the current page to the model interface corresponding to the target application, which enhances the interactivity and immersion of the application. At the same time, it also displays animation and transition effects in a modern graphical interface design to enhance the user experience. Moreover, the corresponding notification is transmitted from the first window to the second window to complete the animation switching of the second window, and thus, the convenience and flexibility are improved.

Alternatively, before displaying the application operation interface corresponding to the target application and the model interface of the three-dimensional in-vehicle model corresponding to the target application, the display method includes a switching completion notification being sent to the first window through the second window.

When the animation switching of the three-dimensional in-vehicle model in the second window is completed, the second window sends the switching completion notification to the first window. The switching completion notification may be in the form of an electric signal or identifier sent to the first window.

Displaying the application operation interface corresponding to the target application and the model interface of the three-dimensional in-vehicle model corresponding to the target application includes: the application operation interface corresponding to the target application and the model interface of the three-dimensional in-vehicle model corresponding to the target application are displayed in a case where the switching completion notification is received.

With the process, the user can experience the effect of smoothly switching from the common application operation interface to the interface of the three-dimensional in-vehicle model, which enhances the interactivity and immersion of the application. At the same time, the use of an inter-window communication and an animation transition technique ensures the smoothness of the switching process and the consistency of the user experience.

Continuing to see FIG. 3, the 3D vehicle model wallpaper window b3 sends the switching completion notification N2 of the completion of the vehicle model animation to the air conditioner window b2 displayed in the first window after the viewing angle is switched. In turn, the smart cockpit may also execute the operations of a page display end in S35 for the air conditioner window b2 and a page hiding end, in S36, for the desktop window b1, and switch the user operation interface of the air conditioner window b2 and the display viewing angle animation of the three-dimensional in-vehicle model to the model interface corresponding to the air conditioner operation. The 3D vehicle model wallpaper window b3 may respond to the air conditioner operation in S37. The page hiding operation for the desktop window b1 simply ends a thread in which the desktop window executes a page hiding start, and does not mean that the desktop window is redisplayed.

The above technical solution may allow the coordination of behaviors and state changes of different windows through the communication between the first window and the second window. A three-dimensional graphic rendering technique is used for switching and displaying the three-dimensional in-vehicle model in the second window, while the animation transition is used for smooth switching of viewing angles to provide a smooth user experience.

Alternatively, as shown in FIG. 5, the first window and the second window are created by the following steps: S51-S54.

In step S51, the first window is created according to a configuration file of the target application.

The configuration file of the target application may include a file with configuration information for the application or a system component, typically used for specifying window properties, layouts, etc.

The configuration file of the target application may contain various detailed information about the first window, such as the size, position, and background color of the window, whether it contains a border, etc. According to the configuration information, the application creates the first window conforming to requirements and initializes various properties of the window.

In step S52, display orders of the first window and the second window are determined according to layout parameters of the first window.

The layout parameters may determine the parameters of positions, sizes, and relative relationships of elements in the windows. The display orders are hierarchical orders among a plurality of windows, and the window displayed in front and behind is determined.

Thus, the smart cockpit may utilize the layout parameters of the first window to determine display orders of various three-dimensional vehicle model components in the second window. These layout parameters may include sizes, positions, Z-axis depths, etc., of the components. According to these parameters, the application may calculate which windows are to be displayed in front and which windows are to be displayed behind, and thus it is ensured that the hierarchical relationship among the various windows can be correctly presented during rendering.

In the example of the disclosure, the embodiment may be based on an Android operating system, and thus, the display order of the second window may be Z-order. Thus, each three-dimensional vehicle model component (e.g., window, control, image, etc.) in the second window has a Z-order value that determines which element is to be displayed in front (lower Z-order value) or behind (higher Z-order value) when the elements overlap.

The creation and management of the windows involve the consistency and predictability of the various three-dimensional vehicle model components in the second window at the user interface, so that the user can clearly see and operate the interacting elements. The display order of the second window is managed by the Z-order.

When the second window is created, the application calculates and sets the Z-order of the second window according to the layout parameters of the first window and other relevant factors. This ensures that when the second window is rendered, the display can be performed according to the expected order and hierarchical structure.

The management of the Z-order not only affects the visual presentation, but also the user interaction. For example, a button that is obscured by another component (i.e., its Z-order value is high) may not be clickable by the user because it is visually invisible. Specifically, a Z-order and visibility of the wallpaper window corresponding to the second window may be calculated, and a window animation may be applied to the wallpaper based on the Window Manager Service. The wallpaper window may be continually adjusted according to a presence condition of a FLAG SHOW WALLPAPER marker in Layout parameters flags of the first window.

In step S53, the visibility of the second window is calculated.

Visibility is the property of whether elements in the second window are visible to the user.

First, a current state of the application directly affects the visibility of the second window. For example, some windows may be automatically hidden or set to be invisible if the application is in a full-screen mode or in a specific operation mode. In addition, an interaction behavior of the user is also a factor in determining the visibility of the window. The user may request to display or hide the second window by clicking, swiping, or triggering specific shortcuts.

If the second window is completely obscured by other windows, it is invisible from the angle of the user. At this point, the application needs to detect a position relationship between the second window and other windows, determine whether there is an obstruction, and set a visibility state of the second window accordingly.

In some scenarios, system settings or user permissions may also restrict the visibility of certain windows. For example, the display of certain application windows is restricted. The application needs to follow these system settings and permission rules to ensure that the visibility of the second window conforms to the expectations and requirements of the user.

The need for dynamic adjustments and real-time updates may also be considered when the visibility of the second window is calculated. The visibility of the second window may need to be adjusted in real time as the application state changes, the user behavior occurs, and the system environment changes. The application needs to monitor these changes and update the visibility state of the second window when necessary to ensure the real-time and consistent user interface.

A plurality of aspects, such as an application state, a user behavior, a window obscuring relationship, a system setting, and a permission, may be comprehensively considered to accurately judge and set the visibility state of the second window. At the same time, requirements may also be dynamically adjusted and updated in real time to ensure the real-time and consistent user interface. Through the process, the application can provide a smoother and more natural interaction experience for the user.

In step S54, window animations are applied to the second window, and the second window is created according to the visibility and the display order.

In the example of the disclosure, the smart cockpit may apply the window animations to the second window. These animations may include effects of window fading in and out, zooming, swiping, etc., and are used for improving the user experience and the smoothness of the interaction. At the same time, according to the previously calculated visibility and display order, the application creates the second window and sets its initial state. If the second window needs to be hidden, it may be placed behind other windows or components, or it may be made visually invisible by setting its transparency to 0.

With the above technical solution, it is possible to create the first window and the second window with complex interaction and animation effects, and a rich visual and interactive experience is provided for the user. At the same time, these steps also demonstrate the complexity and finesse of window management and interface rendering in modern application development.

Alternatively, in step S52, determining the display orders of the first window and the second window according to the layout parameters of the first window includes the display order of the second window is adjusted according to a presence condition of a window marker of the second window in the layout parameter of the first window.

In the example of the disclosure, first, the smart cockpit may read the layout parameters of the first window. These parameters may include a size and position of the window, positions and sizes of the various components, and a relative relationship between them. These parameters define the layout and display mode of the elements in the first window.

Next, the smart cockpit may identify the window marker of the second window. The window marker is a unique identifier used to distinguish between different windows and window components. With the window marker, the application may determine the presence condition of the second window in the layout parameters of the first window.

Further, once the smart cockpit determines the window marker (e.g., a flag of the window) of the second window, the display order of the second window may be adjusted according to the presence condition of the window marker in the layout parameters of the first window.

Moreover, the smart cockpit may determine positions where the various components in the second window are to be placed and a hierarchical relationship among them according to the layout parameters of the second window. For example, some components may need to be placed in front of or behind other components to ensure that they form a visually correct display order. The window marker may also be utilized to associate the second window with related components in the first window. In this way, when the layout of the first window changes, the second window may maintain consistency with the first window by automatically adjusting its position and display order. At the same time, dynamic adjustments and responses are set. If the layout parameters of the first window change dynamically (e.g., the user changes the layout by dragging or resizing the window), the application needs to monitor these changes in real time and dynamically adjust the display order of the second window according to the new layout parameters. This ensures that the user interface can respond to layout changes in real time, and a smooth and consistent user experience is maintained.

Finally, the smart cockpit will apply the calculated display order and render the second window and its components. In the rendering process, it is ensured that the components are displayed on the screen according to the correct hierarchical structure by following the rules of the display order. In this way, the user can clearly see and operate the three-dimensional vehicle model components in the second window.

This may ensure that the hierarchical structure and display orders of the first window and the second window displayed in the user interface are consistent with the layout requirements of the application, and thus, a good user experience is provided.

Alternatively, the method further includes a working state of a vehicle part corresponding to the target application is controlled in response to an operation at the model interface and/or the application operation interface.

For example, the air conditioner may be controlled to be turned on by an application corresponding to the air conditioner in response to an air conditioner turning-on operation by the user at a model interface and/or an application operation interface corresponding to the air conditioner. For another example, the air conditioner may be controlled to adjust a temperature up by an application corresponding to the air conditioner in response to a temperature adjusting-up operation by the user in the model interface corresponding to the air conditioner.

In this way, the conversion and execution of the intention of the user to the actual operation of the vehicle part are implemented through the steps such as user interaction, application logic processing, vehicle hardware control and feedback, and real-time updating.

According to an example of the disclosure, a display apparatus is further provided, as shown in FIG. 6, including: a loading module 110, a switching module 120, and a displaying module 130.

The loading module 110 is configured to load a switched target application in a first window in response to an application switching action.

The switching module 120 is configured to switch a viewing angle of a three-dimensional in-vehicle model preloaded in a second window according to the target application, where the second window is a window below a layer of the first window.

The displaying module 130 is configured to display an application operation interface corresponding to the target application and a model interface of the three-dimensional in-vehicle model corresponding to the target application.

Alternatively, the loading module 110 is configured to: hide a pre-switching application from the first window in response to the application switching action; and load the switched target application in the first window in a case where the pre-switching application is hidden.

Alternatively, the switching module 120 is configured to: send an entry notification for entering the target application to the second window through the first window; and switch the viewing angle of the three-dimensional in-vehicle model preloaded in the second window in a case where the entry notification is received.

Alternatively, the displaying module 130 is configured to, before displaying the application operation interface corresponding to the target application and the model interface of the three-dimensional in-vehicle model corresponding to the target application, send a switching completion notification to the first window through the second window; and display the application operation interface corresponding to the target application and the model interface of the three-dimensional in-vehicle model corresponding to the target application in a case where the switching completion notification is received.

Alternatively, the display apparatus further includes a creating module (not shown), configured to: create the first window according to a configuration file of the target application; determine display orders of the first window and the second window according to a layout parameter of the first window; calculate the visibility of the second window; and apply a window animation to the second window, and create the second window according to the visibility and the display order.

Alternatively, the creating module is configured to adjust the display order of the second window according to a presence condition of a window marker of the second window in the layout parameter of the first window.

Alternatively, the display apparatus further includes a control module (not shown), configured to control a working state of a vehicle part corresponding to the target application in response to an operation at the model interface and/or the application operation interface.

As for the apparatus in the above example, a specific mode in which each module executes operations has been described in detail in the examples of the method, which will not be described in detail here.

An example of the disclosure further provides a vehicle, including a processor and a memory configured to store processor-executable instructions. Where the processor is configured to execute the processor-executable instructions stored in the memory to implement the method according to any one of the foregoing examples.

An example of the disclosure further provides a non-transitory computer-readable storage medium, storing a computer program, and the computer program, in response to being executed by a processor, implements steps of the method according to any one of the foregoing examples.

An example of the disclosure further provides a computer program product, including a computer program, and the computer program, in response to being executed by a processor, implements steps of the method according to any one of the foregoing examples.

FIG. 7 is a block diagram of a vehicle 600 illustrated according to an example. For example, the vehicle 600 may be a hybrid vehicle, a non-hybrid vehicle, an electric vehicle, a fuel cell vehicle, or other types of vehicles. The vehicle 600 may be an autonomous vehicle, a semi-autonomous vehicle, or a non-autonomous vehicle.

Referring to FIG. 7, the vehicle 600 may include various subsystems, such as an infotainment system 610, a sensing system 620, a decision control system 630, a drive system 640, and a computing platform 650. The vehicle 600 may also include more or fewer subsystems, and each subsystem may include a plurality of parts. In addition, each subsystem and each part of the vehicle 600 may be interconnected with each other by wired or wireless means.

In some examples, the infotainment system 610 may include a communication system, an entertainment system, a navigation system, etc.

The sensing system 620 may include several kinds of sensors for sensing information about the environment surrounding the vehicle 600. For example, the sensing system 620 may include a global positioning system (the global positioning system may be a GPS, a BeiDou system, or other positioning systems), an inertial measurement unit (IMU), a lidar, a millimeter wave radar, an ultrasonic radar, and a camera apparatus.

The decision control system 630 may include a computing system, an overall vehicle controller, a steering system, a throttle, and a braking system.

The drive system 640 may include a component that provides powered movement for the vehicle 600. In one example, the drive system 640 may include an engine, an energy source, a transmission system, and wheels. The engine may be one or a combination of an internal combustion engine, an electric motor, and an air compression engine. The engine can convert energy provided by the energy source into mechanical energy.

Some or all of the functions of the vehicle 600 are controlled by the computing platform 650. The computing platform 650 may include at least one processor 651 and memory 652, and the processor 651 may execute instructions 653 stored in the memory 652.

The processor 651 may be any conventional processor, such as a commercially available CPU. The processors may also include, for example, a graphics processing unit (GPU), a field-programmable gate array (FPGA), a system on chip (SOC), an application-specific integrated circuit (ASIC), or a combination of them.

The memory 652 may be implemented by any type of volatile or nonvolatile storage device or their combination, such as a static random-access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

In addition to the instructions 653, the memory 652 may also store data, such as road maps, route information, and the position, direction, speed, and other data of the vehicle. The data stored in the memory 652 may be used by the computing platform 650.

In the example of the disclosure, the processor 651 may execute the instructions 653 to complete all or some of the steps of the display methods above.

Those skilled in the art may further appreciate that various illustrative logical blocks and steps set forth in the examples of the present disclosure may be implemented by electronic hardware, computer software, or a combination of the two. Whether such a function is implemented by hardware or software depends on the specific application and the design requirements of an overall system. Those skilled in the art may, for each specific application, use various methods to implement the described function, but such implementation is not to be construed as being outside the scope of protection of the examples of the present disclosure.

In addition, the word "exemplary" is used here to denote an example, an instance, and an illustration. Any aspect or design described here as "exemplary" is not necessarily understood to be advantageous over other aspects or designs. Instead, the use of the word "exemplary" aims to present concepts in a concrete way. As used here, the term "or" is intended to denote an inclusive "or" rather than an exclusive "or". That is, unless otherwise specified, or unless it is clear from the context, "X applies A or B" is intended to denote any one of natural inclusive arrangements. That is, if X applies A; X applies B; or X applies both A and B, then "X applies A or B" is satisfied under any one of the preceding instances. Furthermore, unless otherwise specified or unless the context clearly points to a singular form, articles "one" and "a", as used in the present disclosure and appended claims, are generally understood to denote "one or more".

Similarly, although the disclosure has been shown and described with respect to one or more embodiments, equivalent variations and modifications will come to mind by those skilled in the art after reading and understanding the specification and accompanying drawings. The disclosure includes all such modifications and variations and is limited merely by the scope of the claims. With particular regard to the various functions executed by the components (e.g., elements, resources, etc.) described above, unless otherwise noted, the terms used to describe such components are intended to correspond to any component (functionally equivalent) that executes the specific functions of the described components, even if not structurally equivalent to the disclosed structure. Further, although particular features of the disclosure may have been disclosed with respect to merely one of a plurality of embodiments, such features may be combined with one or more other features of other embodiments, as may be desired and beneficial for any given or particular application. In addition, as used in specific embodiments or claims, terms "include," "possess," "have," "there is," or variations of them are intended to be inclusive in a manner similar to the term "contain".

Other implementation solutions of the disclosure will be apparent to those skilled in the art from consideration of the specification and practice of the disclosure disclosed here. The present disclosure is intended to cover any variation, use, or adaptation of the disclosure that follows the general principles of the disclosure and includes common knowledge or customary technical means in the technical field that are not disclosed in the disclosure. The specification and examples are considered as examples merely, and the true scope and spirit of the disclosure are indicated by the appended claims.

It is to be understood that the disclosure is not limited to the exact construction that has been described above and illustrated in the accompanying drawings, and various modifications and changes may be made without departing from its scope. The scope of the disclosure is merely limited by the appended claims.

The invention claimed is:

1. A display method, comprising:

loading a switched target application in a first window in response to an application switching action;

switching a viewing angle of a three-dimensional in-vehicle model preloaded in a second window according to the switched target application to obtain a viewing angle of a user interface, wherein the second window is a window below a layer of the first window, the viewing angle of the user interface matches a vehicle part associated with the switched target application, and a working state of the vehicle part is capable of being controlled; and displaying an application operation interface corresponding to the switched target application and a model interface of the three-dimensional in-vehicle model corresponding to the switched target application.

2. The method according to claim 1, wherein loading the switched target application in the first window in response to the application switching action comprises:

hiding a pre-switching application from the first window in response to the application switching action; and loading the switched target application in the first window in a case where the pre-switching application is hidden.

3. The method according to claim 1, wherein switching the viewing angle of the three-dimensional in-vehicle model preloaded in the second window according to the switched target application comprises:

sending an entry notification for entering the switched target application to the second window via the first window; and switching the viewing angle of the three-dimensional in-vehicle model preloaded in the second window in a case where the entry notification is received.

4. The method according to claim 3, before displaying the application operation interface corresponding to the switched target application and the model interface of the three-dimensional in-vehicle model corresponding to the switched target application, comprising:

sending a switching completion notification to the first window via the second window;

wherein displaying the application operation interface corresponding to the switched target application and the model interface of the three-dimensional in-vehicle model corresponding to the switched target application comprises:

displaying the application operation interface corresponding to the switched target application and the model interface of the three-dimensional in-vehicle model corresponding to the switched target application in a case where the switching completion notification is received.

5. The method according to claim 1, further comprising:

creating the first window according to a configuration file of the switched target application.

6. The method according to claim 5, further comprising:

determining display orders of the first window and the second window according to a layout parameter of the first window;

calculating visibility of the second window; and applying a window animation to the second window, and creating the second window according to the visibility and the display orders.

7. The method according to claim 6, wherein determining the display orders of the first window and the second window according to the layout parameter of the first window comprises:

adjusting the display order of the second window according to a presence condition of a window marker of the second window in the layout parameter of the first window.

8. The method according to claim 1, further comprising:

controlling a working state of a vehicle part corresponding to the switched target application in response to at least one of an operation at the model interface or the application operation interface.

9. The method according to claim 6, wherein the visibility is determined based on at least one of:

an application state, a user behavior, a window obscuring relationship, a system setting or a user permissions.

10. A vehicle, comprising:

one or more processors; and one or more non-transitory memories configured to store processor-executable instructions;

wherein the one or more processors are configured to execute the processor-executable instructions stored in the one or more non-transitory memories, and the processor-executable instructions cause the one or more processors to collectively:

load a switched target application in a first window in response to an application switching action;

switch a viewing angle of a three-dimensional in-vehicle model preloaded in a second window according to the switched target application to obtain a viewing angle of a user interface, wherein the second window is a window below a layer of the first window, the viewing angle of the user interface matches a vehicle part associated with the switched target application, and a working state of the vehicle part is capable of being controlled; and display an application operation interface corresponding to the switched target application and a model interface of the three-dimensional in-vehicle model corresponding to the switched target application.

11. The vehicle according to claim 10, wherein the one or more processors are further configured to:

hide a pre-switching application from the first window in response to the application switching action; and load the switched target application in the first window in a case where the pre-switching application is hidden.

12. The vehicle according to claim 10, wherein the one or more processors are further configured to:

send an entry notification for entering the switched target application to the second window via the first window; and switch the viewing angle of the three-dimensional in-vehicle model preloaded in the second window in a case where the entry notification is received.

13. The vehicle according to claim 12, wherein the one or more processors are further configured to:

send a switching completion notification to the first window through-via the second window;

display the application operation interface corresponding to the switched target application and the model interface of the three-dimensional in-vehicle model corresponding to the switched target application in a case where the switching completion notification is received.

14. The vehicle according to claim 10, wherein the one or more processors are further configured to:

create the first window according to a configuration file of the switched target application.

15. The vehicle according to claim 14, wherein the one or more processors are further configured to:

determine display orders of the first window and the second window according to a layout parameter of the first window;

calculate visibility of the second window; and apply a window animation to the second window, and create the second window according to the visibility and the display orders.

16. The vehicle according to claim 15, wherein the one or more processors are further configured to:

adjust the display order of the second window according to a presence condition of a window marker of the second window in the layout parameter of the first window.

17. The vehicle according to claim 10, wherein the one or more processors are further configured to:

control a working state of a vehicle part corresponding to the switched target application in response to at least one of an operation at the model interface or the application operation interface.

18. The vehicle according to claim 15, wherein the one or more processors are further configured to:

determine the visibility according to at least one of:

an application state, user behavior, window obscuring relationship, a system setting or a user permissions.

19. A non-transitory computer-readable storage medium; storing a computer program, wherein the computer program, when executed by one or more processors, causes the one or more processors to collectively perform a method comprising, the method comprising:

loading a switched target application in a first window in response to an application switching action;

switching a viewing angle of a three-dimensional in-vehicle model preloaded in a second window according to the switched target application to obtain a viewing angle of a user interface, wherein the second window is a window below a layer of the first window, the viewing angle of the user interface matches a vehicle part associated with the switched target application, and a working state of the vehicle part is capable of being controlled; and displaying an application operation interface corresponding to the switched target application and a model interface of the three-dimensional in-vehicle model corresponding to the switched target application.

20. The method according to claim 1, wherein the second window is invisible to a user.

* * * * *